(12) United States Patent
Hanlon et al.

(10) Patent No.: US 10,364,026 B1
(45) Date of Patent: Jul. 30, 2019

(54) TRACK AND TETHER VEHICLE POSITION ESTIMATION

(71) Applicant: Amazon Technologies, Inc., Seattle, WA (US)

(72) Inventors: Jon T. Hanlon, Mercer Island, WA (US); Neil Whitney Woodward, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/860,317

(22) Filed: Sep. 21, 2015

(51) Int. Cl.
 *B64C 39/02* (2006.01)
 *G05D 1/10* (2006.01)

(52) U.S. Cl.
 CPC .......... *B64C 39/022* (2013.01); *B64C 39/024* (2013.01); *G05D 1/101* (2013.01); *B64C 2201/024* (2013.01); *B64C 2201/141* (2013.01)

(58) Field of Classification Search
 CPC ............... B64C 39/024; B64C 39/022; B64C 2201/104; B64C 2201/141; B64C 2201/148; B64C 2201/121; B64C 2201/127; B64C 2201/208; G05D 1/0094; G05D 1/0088; G05D 1/101
 USPC ........ 33/203.13; 280/734; 73/1.09; 356/407; 375/228; 244/2, 17.23, 135 R, 99.2; 114/318; 290/55, 44; 359/446; 254/385; 250/395; 701/3, 4, 13, 18, 24; 40/414
 See application file for complete search history.

(56) References Cited

U.S. PATENT DOCUMENTS

| | | | | |
|---|---|---|---|---|
| 3,187,440 A | * | 6/1965 | Erickson | G01B 7/315 33/203.13 |
| 4,037,358 A | * | 7/1977 | Rosenbaum | A63H 27/04 40/414 |
| 6,079,738 A | * | 6/2000 | Lotito | H03K 17/955 280/734 |
| 6,609,407 B1 | * | 8/2003 | Tambini | G01L 25/003 73/1.09 |
| 8,091,461 B1 | * | 1/2012 | Buescher | F41F 7/00 114/318 |
| 9,446,858 B2 | * | 9/2016 | Hess | B64F 3/02 |
| 9,599,995 B2 | * | 3/2017 | North | G05D 1/08 |
| 2003/0227626 A1 | * | 12/2003 | Dobbs | G01S 17/89 356/407 |
| 2006/0074557 A1 | * | 4/2006 | Mulligan | G05D 1/0094 701/13 |
| 2009/0310664 A1 | * | 12/2009 | Yannone | G01S 5/0294 375/228 |
| 2011/0180667 A1 | * | 7/2011 | O'Brien | B64C 39/022 244/135 R |

(Continued)

*Primary Examiner* — Kimberly S Berona
*Assistant Examiner* — Sanjeev Malhotra
(74) *Attorney, Agent, or Firm* — Lee & Hayes, P.C.

(57) ABSTRACT

A UAV tethering system provides an environment in which to fly an unmanned aerial vehicle (UAV) where the tether is selected to prevent the UAV from unintentional contact with the ground or other objects within the flight area. A tether may connect the UAV to a shuttle that slides along a track. The tether may be used to provide efficient, robust and accurate positioning information. The system can be configured to detect the angle at which the tethering line extends from the shuttle, the length of the extended tethering line, and then compute the position of the UAV relative to the shuttle. Furthermore, by knowing the position of the shuttle, the absolute position of the UAV can be determined.

20 Claims, 10 Drawing Sheets

(56) References Cited

U.S. PATENT DOCUMENTS

| | | | |
|---|---|---|---|
| 2011/0202224 A1* | 8/2011 | Thompson | G05D 1/0227 701/26 |
| 2011/0315810 A1* | 12/2011 | Petrov | B64C 39/022 244/17.23 |
| 2012/0123628 A1* | 5/2012 | Duggan | G05D 1/0061 701/24 |
| 2012/0232721 A1* | 9/2012 | Engblom | B64C 37/02 701/3 |
| 2013/0233964 A1* | 9/2013 | Woodworth | B64C 37/02 244/2 |
| 2013/0307274 A1* | 11/2013 | Sia | F03D 5/00 290/55 |
| 2014/0058593 A1* | 2/2014 | Allen | B64D 45/00 701/4 |
| 2014/0233099 A1* | 8/2014 | Stark | G09F 21/06 359/446 |
| 2014/0284531 A1* | 9/2014 | Hoyt | B66D 1/38 254/385 |
| 2014/0379179 A1* | 12/2014 | Goossen | G08G 5/02 701/18 |
| 2015/0021427 A1* | 1/2015 | Heppe | B64B 1/40 244/2 |
| 2015/0153741 A1* | 6/2015 | North | G05D 1/08 290/44 |
| 2016/0018532 A1* | 1/2016 | Scott | G01T 1/00 250/395 |
| 2016/0025457 A1* | 1/2016 | Miralles | F41G 7/008 701/3 |
| 2016/0083115 A1* | 3/2016 | Hess | B64C 3/02 701/3 |
| 2016/0200437 A1* | 7/2016 | Ryan | B64C 39/022 244/99.2 |
| 2016/0209850 A1* | 7/2016 | Golubev | G05D 1/0825 |
| 2016/0357192 A1* | 12/2016 | McGrew | B64D 47/08 |
| 2018/0002018 A1* | 1/2018 | Jourdan | B64C 39/024 |

* cited by examiner

Section A-A

TRACK AND TETHER VEHICLE POSITION ESTIMATION

BACKGROUND

Unmanned aerial vehicles ("UAVs") are becoming increasingly popular and useful for many purposes. For example, UAVs are becoming useful for flying enjoyment, aerial photography, payload delivery, and other uses. UAVs, especially those used for commercial purposes, are oftentimes relatively expensive and the risks of damaging a UAV during development, testing, or operation can be quite high. Additionally, determining the position of a UAV can be problematic, especially in areas were global positioning system (GPS) signals may not be sufficiently strong to receive robust positioning data, such as an indoor flying environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
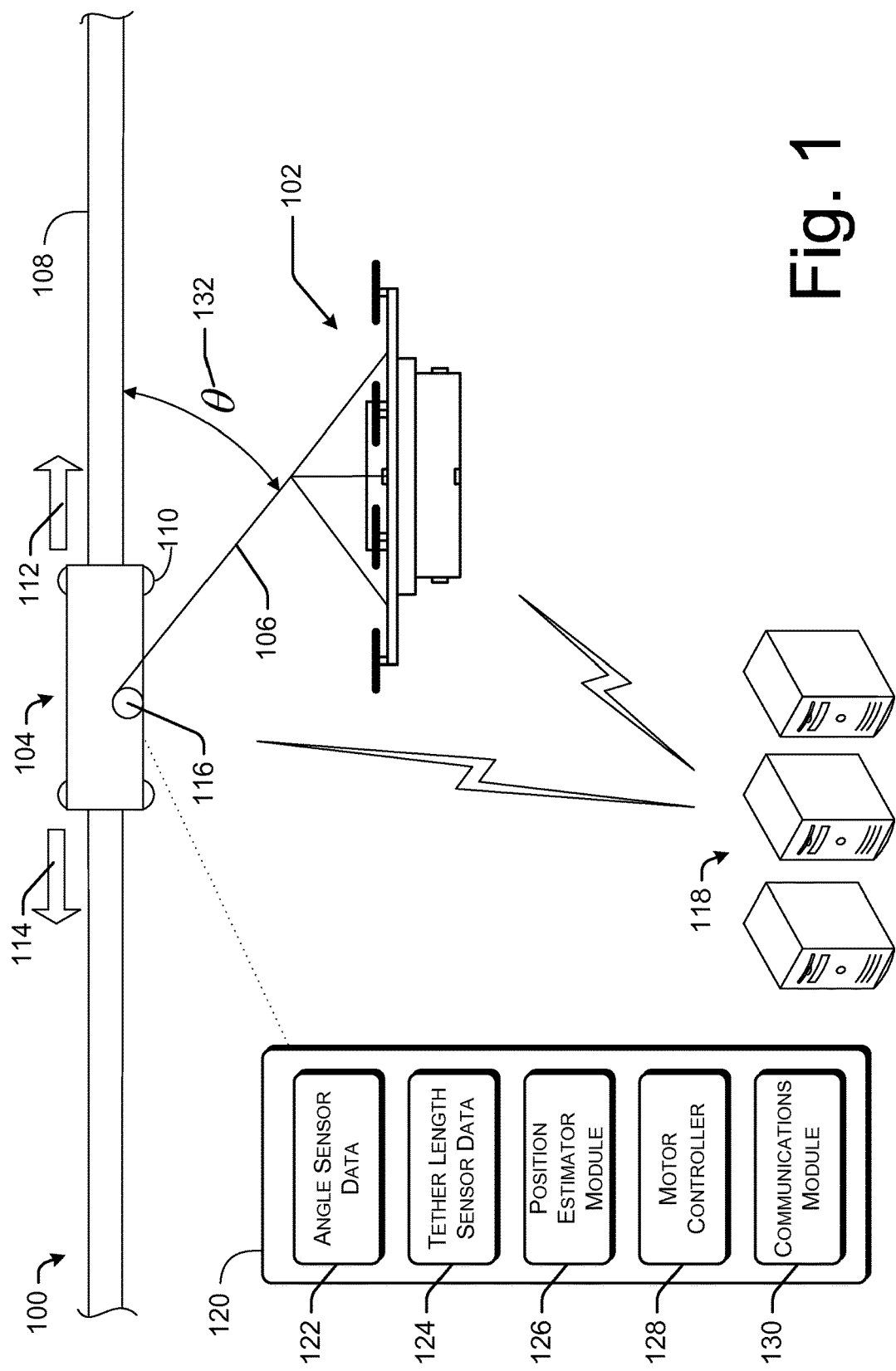
FIG. 1 is a schematic diagram of an example system of a UAV tethering and communication system in which a UAV is tethered to a shuttle that slides along a track.

While implementations are described herein by way of example, those skilled in the art will recognize that the specific implementations described and illustrated herein are not limiting. It should be understood that the drawings and detailed description are not intended to limit implementations to the particular form disclosed, but rather, are used to illustrate and explain exemplary embodiments and to convey and clarify the ideas behind those embodiments.

DETAILED DESCRIPTION

The disclosure describes a tethering system for ascertaining and communicating the position of a UAV attached thereto. A UAV can be relatively expensive to develop, test, and repair. One of the difficulties, especially when testing a UAV, is the fact that there are numerous obstacles within a flight environment that can seriously damage a UAV, especially where the navigation system of the UAV may not be robust. Furthermore, determining an accurate position of the UAV may also be problematic in some situations, such as when the UAV is operating within a building where GPS signals may not be sufficiently robust or reliable. In an effort to ameliorate some of these problems, sample embodiments are disclosed herein that provide a tethering system to inhibit the UAV from contacting obstacles within the flying environment. In addition, an efficient and robust positioning system is described that results in accurate positioning information for the UAV, even in those environments where GPS navigation systems may not be reliable.

In some implementations, the UAV may be attached by a tether to a shuttle that is slidably engaged with a track that defines a pathway. In some embodiments, the track may be suspended from a ceiling of a building, or otherwise affixed overhead. Alternatively, the track may be positioned on or near the ground. In either configuration, a shuttle is preferably slidably engaged with the track. The shuttle may have one or more wheels that engage the track and allow the shuttle to roll along the track. In other implementations, the shuttle may slide along the track through a low friction engagement, or may follow the track without contacting the track, such as through magnetic levitation. Additionally, the shuttle may be positioned above the track, suspended below the track, reside inside the track, or may generally encompass the track. The term "shuttle" should not be construed as limiting nor should it convey any specific structure. For example, the shuttle may be referred to as a trolley, a dolly, a cart, or other suitable device that can be configured to follow a pathway and support a tether. In some embodiments, the shuttle is outfitted with one or more wheels that roll along a track. Some shuttle embodiments have wheels that roll along the top of the track, while other embodiments employ wheels that roll on the top and the bottom of the track. Of course, other implementations and configurations are possible for guiding a shuttle along a track.

The track may be any form of guiding member that guides the shuttle along a pathway. For example, the track may be a line attached at its ends to a support structure. It may likewise be a tube, a rod, or a steel cable. Alternatively, the track need not have a circular cross section. For example, in some embodiments, the track exhibits a generally T-shaped cross section, an L-shaped cross section, or a C-shaped cross section. In short, the track may be formed of any suitable structure and configuration that provides a pathway to guide the shuttle.

In some embodiments, the shuttle carries a reel that has a tethering line wound about a spool. One end of the tethering line may be connected to the spool while its other end may be connected to the UAV. The reel may payout the tethering line as the UAV moves further away from the shuttle, and may retract the tethering line as the UAV moves closer to the shuttle.

In some implementations, the reel has a spool upon which the tethering line is wound. The spool may be motorized so that the spool extends or retracts the tethering line automatically. In other implementations, the spool includes a spring that biases the reel to rotate in a retracting direction and it relies on the pull of the UAV to extend the tethering line. The tethering line may be any suitable device that can support the UAV, such as a cable, twine, a strap, and may be formed of any suitable material, such as cotton, nylon, copper, steel, a suitable polymer, or any suitable combination of materials. In some instances, the tethering line is configured to transmit electricity to the UAV and may additionally transmit data to and from the UAV.

The tethering line may be appropriately sized to not only support the UAV during flying and emergency procedures, but may also be designed to prevent the UAV from impacting the ground or other nearby obstacles. For example, the tethering line may have its maximum extended length determined by the shortest distance from the reel to the ground, such that even if the UAV were to lose power and fall during flight, the tethering line would prevent the UAV from striking the ground.

In other implementations, the reel may be motorized and the length of the tethering line can be automatically adjusted during flight, such as where the ground may be uneven, or where there may be obstacles that could potentially interfere with the UAV. For example, where the UAV is being flown indoors, the reel may automatically change the maximum length of the extended tethering line so that the UAV will avoid obstacles in its potential flight path, such as tables, people, boxes, trucks, or any other such obstruction. In some implementations, the tethering system may include a terrain sensor that may detect any possible obstructions to the UAV, and provide information to control the maximum length of the tethering line in response to detecting obstructions within the flying environment. The potential obstructions may be detected by the UAV, by the shuttle, or may be programmed into the central controller. For example, ranging sensors, such as radar or laser ranging sensors may be implemented on the UAV, on the shuttle, on the track, or a combination. Additionally, the flying environment may be pre-programmed into the central controller and the information may be used by the shuttle to vary the maximum length of the extended tethering line so that the UAV will avoid obstacles located within the flight environment.

In some embodiments, the reel contains one or more sensors. For example, a distance sensor may be configured to determine the length of the tethering line that has been extended from the spool. Additionally, an angle sensor may be able to determine the angle at which the tethering line extends away from the shuttle. By utilizing these sensors, the tethering system is able to determine the relative position between the UAV and the shuttle. Moreover, in embodiments in which the shuttle position is able to be determined, the absolute position of the UAV can be determined.

While there are several methods for determining the UAV position, such as GPS, this is not always a reliable or robust way of determining UAV position, such as when the UAV is flying indoors, or where there may be an insufficient signal to receive GPS coordinate data consistently. By using the described sensors, the position of the UAV can be determined very quickly and reliably. The UAV position data can be sent to one or more central controllers. Alternatively, the UAV position data can be sent to the UAV and/or the shuttle.

The central controller may communicate wirelessly with the shuttle and/or the UAV. In some instances, the central controller, the shuttle, and the UAV have wireless communication capabilities to receive and transmit data such as navigation information, position information, command information, speed, energy efficiency, altitude and other such data that may be useful to operate, control, track, or save for later access regarding the UAV's flight.

In order to allow the tethered UAV to operate as freely as possible, it may be desirable to reduce or eliminate the forces that the tether may impart to the UAV. For example, the tethering line may need to be tensioned to allow accurate positioning information to be determined and also to inhibit the tethering line from contacting the rotor(s) or propeller(s) of the UAV. The tethering line tension may impart forces to the UAV that may affect its flight characteristics. This may be pronounced in embodiments in which the shuttle freely moves along the track and relies upon the UAV to pull it along the track. In some embodiments, the shuttle may be motorized so that it can move along the track without being pulled by the UAV. In other embodiments, the shuttle may be attached to a drive line that is able to pull the shuttle along the track. For example, a drive line may be attached to both the front and rear of the shuttle and the drive line can be attached to a motor, pulley, reel or some other system for tightening the drive line and pulling the shuttle along the track in either direction to minimize the effects on the UAV due to the tethering line tension.

In some instances, the structure used for attaching the tethering line to the UAV is designed to reduce or minimize the influence of the tethering line on the UAV as it flies. For example, the tethering line may be attached by a harness, such as a 3-point or 4-point harness so as to provide spaced attachment points about the UAV. In another example, a two-axis gimbal may be formed around the UAV, such as a gimbaled cage. The tethering line may be attached to the outer portion of the gimbal, which is free to rotate about two axes of the UAV and locate the attachment point of the tethering line to the gimbal so that it points toward the shuttle.

The tethering system is preferably designed to support the full weight of the UAV, such as if the UAV loses power and falls, uncontrolled, from the sky. The tethering system preferably arrests the freefall of the UAV and maintains it in a position above the terrain to prevent it from crashing into the ground or other nearby objects.

FIG. 1 depicts a side view of a tethering system 100, including a UAV 102, a shuttle 104, and a tethering line 106 connecting the UAV 102 to the shuttle 104. The shuttle 104 is preferably configured to follow a pathway defined by a track 108 and may do so by rolling on one or more wheels 110. The shuttle 104 may have a single wheel 110 that rolls from above the track 108, it may also have two wheels 110 that roll from above the track, or may also have multiple wheels 110 wherein some are disposed above the track 110 and some are below the track 110 as illustrated. In this way, the shuttle 104 may be in secure rolling engagement with the track 108 with little fear of the shuttle 104 falling off the track 108, even if the shuttle 104 rotates about its longitudinal axis. Moreover, the shuttle 104 may have additional wheels 110 configured to roll along the track and they may be on the side of the shuttle 104 or in other locations. In fact, some or all of the wheels 110 may be spherical, such as bearings, that are capable of rolling in any direction to allow the shuttle 104 to not only roll in a forward direction 112 or a backward direction 114, but to also rotate about its longitudinal axis about the track 108.

In some cases, the track 108 has a circular cross section, and the shuttle 104 is configured to rotate around the track in addition to rolling along the track 108. This freedom of movement allows the shuttle 104 to more accurately track the relative position of the UAV 102 and will be described in additional detail.

The UAV 102 may be any suitable UAV 102 and may be a fixed wing, rotary wing, or multi-wing vehicle. In some instances, the UAV 102 is a rotary wing vehicle comprising multiple rotors, such as 3, 4, 6, 8 or more rotors. These types of vehicles have gained wide popularity and are widely used. However, they can be expensive to develop, test, and deploy. Some of the devices and processes described herein can be used to create a robust testing environment, by helping the UAV 102 to avoid obstacles, such as the ground, in the event of navigation system failure. Moreover, by using the systems and techniques described herein, an accurate position of the UAV 102 can be ascertained through a wired connection, which is especially useful where GPS isn't sufficiently reliable or accurate.

The shuttle 104 may be configured with a reel 116 that houses the tethering line 106. The reel may be any suitable reel that is designed to extend and retract a tethering line 106. In some embodiments, the reel may be spring loaded such that it is biased to retract the tethering line 106 absent any forces that pull the tethering line 106 in an extending direction. In this implementation, the spring is preferably designed so that the force required to extend the tethering line 106 is fairly minimal and the UAV 102 is able to easily pull the tethering line 106 to extend it while in flight without causing detrimental forces on the flight characteristics of the UAV 102.

In some other embodiments, the reel 116 may incorporate a motor designed to wind or unwind the tethering line 106. The reel may be controlled by an on-board computer, or may be controlled by an off-board computer. In either case, the commands to wind or unwind can be generated and sent to the reel based upon a current flight path and/or a predicted flight path of the UAV 102. For example, the UAV 102 can be tracked and its trajectory and speed will be known quantities and can therefore be used to issue commands to extend or retract the tethering line 106 to maintain a predetermined amount of tension on the tethering line 106. Additionally, in those embodiments in which the terrain and surrounding environment is known or can be detected, the reel 116 can be controlled to extend a maximum length of tethering line 106 that will prevent the UAV 102 from striking anything within the flying environment, such as a wall, an observer, a ceiling, or the floor.

In some embodiments, the shuttle 104 includes computing resources, such as a shuttle controller 120, that are designed to determine the position of the shuttle 104, determine the position of the UAV 106, control the reel 116, issue commands to the UAV 102, receive data from the UAV 102, and/or communicate with off-board computing resources, such as central controller 118.

The shuttle controller 120 may include a processor, memory, and one or more modules. Additionally, the shuttle controller 120 may be in communication with one or more sensors, controllers, and the UAV 102. For example, the memory may have access to the modules and may store or otherwise use data generated by the sensors. Specifically, the shuttle controller 120 may receive angle sensor data 122 from an angle sensor configured to determine the angle that the UAV is relative to the shuttle 104 or the track 108. The shuttle controller 120 may alternatively, or additionally, receive angle sensor data 122 that is generated based upon one or more images captured by a camera or other type of optical device. The shuttle controller 120 may additionally receive tether length sensor data 124 from a tether length sensor that can be used to determine the distance that the UAV 102 is away from the shuttle 104. The shuttle 104 may also be able to determine its own position along the track 108 such as by determining the number of revolutions of its one or more wheels 110. The shuttle 104 may also be able to determine its position along the track 108 through sensors that can detect the proximity of the shuttle 106 to an immovable object, such as a wall; through optical sensors; or through data received from the central controller 118. In any case, the shuttle controller 120 may be able to utilize the angle sensor data 122 and the tether length sensor data 124 to determine the relative position of the UAV 102 to the shuttle 104. Additionally, in those embodiments in which the shuttle controller 120 is able to determine the position of the shuttle 104, it can use the relative position of the UAV 102 to determine an absolute position of the UAV 102. The absolute position of the UAV 102 may be expressed in any desired coordinate space. For example, the absolute position of the UAV 102 may be in terms of the building in which it is flying. Specifically, the UAV 102 position may be determined to be thirty feet from the South wall of the building in which it is operating, 15 feet above the floor, and fifty feet from the East wall. Additionally or alternatively, the absolute position of the UAV 102 may be translated into GPS coordinates, or some other coordinate space.

Additional sensors may be used to ascertain the position of the UAV 102, such as barometric pressure sensors, or radar or laser ranging systems, among others. For example, a ranging sensor, such as a radar or laser, may be implemented to ascertain the position of the UAV 102 from an obstacle, such as a wall, floor, ceiling, or other obstacle within the flying environment.

The shuttle controller 120 may include specific hardware and/or software for ascertaining the position of the shuttle 104 and the UAV 102. Additionally, the shuttle controller may have additional hardware and/or software for detecting and controlling the position of the shuttle 104. In some embodiments, the shuttle controller 120 may include a power supply for providing power to the UAV 102, such as through the tethering line 106. In other embodiments, the shuttle controller 120 may send or receive data communications to and from the UAV 102, such as through the tethering line 106.

In some embodiments, the shuttle controller 120 receives information regarding the position of the UAV 102, such as angle sensor data 122 that indicates the relative direction θ 132 that the tethering line 106 is extending away from the shuttle 104 and tether length sensor data 124 that indicates the length of the tethering line 106 that has been extended from the reel 116. The shuttle controller 120 may also have a position estimator module 126 that can use the angle sensor data 122 and the tether length sensor data 124 to determine the approximate position of the UAV 102 relative to the shuttle 104.

The shuttle controller 120 may be contained within the shuttle 104, or may be located within the central controller 118, or may be a combination of both. Specifically, some of the described functions of the shuttle controller 120 may be handled within the shuttle 104, while others of the described functions may be handled within the central controller 118. For example, the shuttle may have one or more sensors that generate angle sensor data 122 and tether length sensor data 124 and send this information to the central controller 118 for processing. The central controller 118 may issue instructions to the shuttle 104 and/or the UAV 102 based upon the data received from the shuttle 104. In addition, the central controller 118 may issue commands to the shuttle 104 regarding extending or retracting the tethering line 106 or moving along the track 108.

As the UAV 102 moves away from the shuttle 104, such as in a forward direction 112, the UAV 102 will pull on the tethering line 106 and the tension of the tethering line 106 will impart forces on both the UAV 102 and the shuttle 104. In those embodiments in which the shuttle 104 is able to freely move along the track 108, the UAV 102 will pull the shuttle along the track 108. However, relying on the UAV 102 to pull the shuttle 104 along the track will impart forces onto the UAV 102 that may affect its flight characteristics. One way to reduce the effects of the shuttle 104 and the tethering line 106 on the UAV 102 is to decouple the movement of the shuttle 104 from the movement of the UAV 102.

In one embodiment, the shuttle controller 120 may contain a motor controller 128 that may be able to activate one or more motors within the shuttle 104 for repositioning the shuttle 104 along the track 108. The motor controller 128 may rely on the output from the position estimator module 126, which indicates a position of the UAV 102 relative to the shuttle 104, to reposition the shuttle 104 to minimize the effects the tethering line 106 may impart to the UAV 102. For example, where the position estimator module 126 determines that the UAV 102 is ahead of the shuttle in a forward direction 112 by a distance that exceeds a threshold distance, the motor controller 128 may activate a motor within the shuttle 104 to reposition the shuttle 104 so that it is closer to the UAV 102.

The airspace available to the UAV 102 when tethered to the shuttle 102 may be described as a swept circle. That is, the airspace that the UAV 102 is capable of flying in, while tethered, is limited by the length of the tethering line 106 and the pathway created by the track 108. More specifically, the UAV 102 is free to move in a circle about the shuttle 104 where the circle has a radius equal to the length of the tethering line 106 that has been extended from the reel 116 and where the center of the circle is the reel 116. The UAV 102 may also fly in a forward direction 112 and a backward direction 114 as the shuttle 104 moves along the track 108. Thus, over distances of the track 108 that are substantially straight, the total airspace that the UAV 102 can occupy has a cylindrical shape with its longitudinal axis being approximately aligned with the track 108. Of course, the track 108 may not always continue in a straight line, so the above description of a cylindrical airspace may not be accurate for all instances, but will suffice for this description.

One way of minimizing, or at least reducing, the effect that the shuttle 104 and tethering line 106 will have on the flying UAV 102 is by attempting to minimize the tendency of the shuttle 104 to impose drag on the UAV 102 as the UAV 102 attempts to pull the shuttle 104 along the track 108. In other words, by positioning the shuttle 104 such that the angle θ 132 formed by the tethering line 106 and the track 108 is about ninety degrees, the force applied from the tethering line 106 will be orthogonal to the longitudinal axis of the track 108 and will not impart substantial forces that tend to pull the shuttle 104 along in a forward direction 112 or a backward direction 114 along the track. In other words, it may be desirable for the shuttle 104 to maintain an orientation where it is nearly above, or next to, the UAV 102, rather than ahead or behind it. Moreover, in those embodiments where the shuttle 104 is able to move along the track 108 in response to the UAV 102 flying in a forward direction 112 or a backward direction 114, there will be little risk that the UAV 102 will fully extend the tethering line 106 out of the reel 116 as the UAV 102 flies in a forward direction 112 or a backward direction 114 which may have a dramatic and immediate effect on the flight of the UAV 102.

The shuttle controller 120 may contain a communications module 130 that may be able to communicate with the central controller 118 and/or communicate with the UAV 102. The communications module 130 may implement one or more of various wireless technologies, such as Wi-Fi, Bluetooth, radio frequency (RF), and so on. Alternatively, the communications module 130 may communicate through a wired communication, such as through a data link with the UAV 102 through the tethering line 106. The communications module 130 may also rely on a combination of wired and wireless communication protocols to send and/or receive data to and from the UAV 102, the central controller 118, or both.

The communications module 130 may receive commands from the central controller 118, such as navigation commands to pass on to the UAV 102. The commands received from the central controller 118 may also relate to repositioning the shuttle 104 to maintain its relative position to the UAV 102 during flight. The communications module 130 may also send data to the central controller 118, such as flight information of the UAV 102 comprising speed, altitude, duration, electrical current draw, distance, and flight time, for example. Of course, the central controller 118 may communicate directly with the UAV 102, such as for sending flight commands and receiving information regarding the UAV 102.

Figure 2:
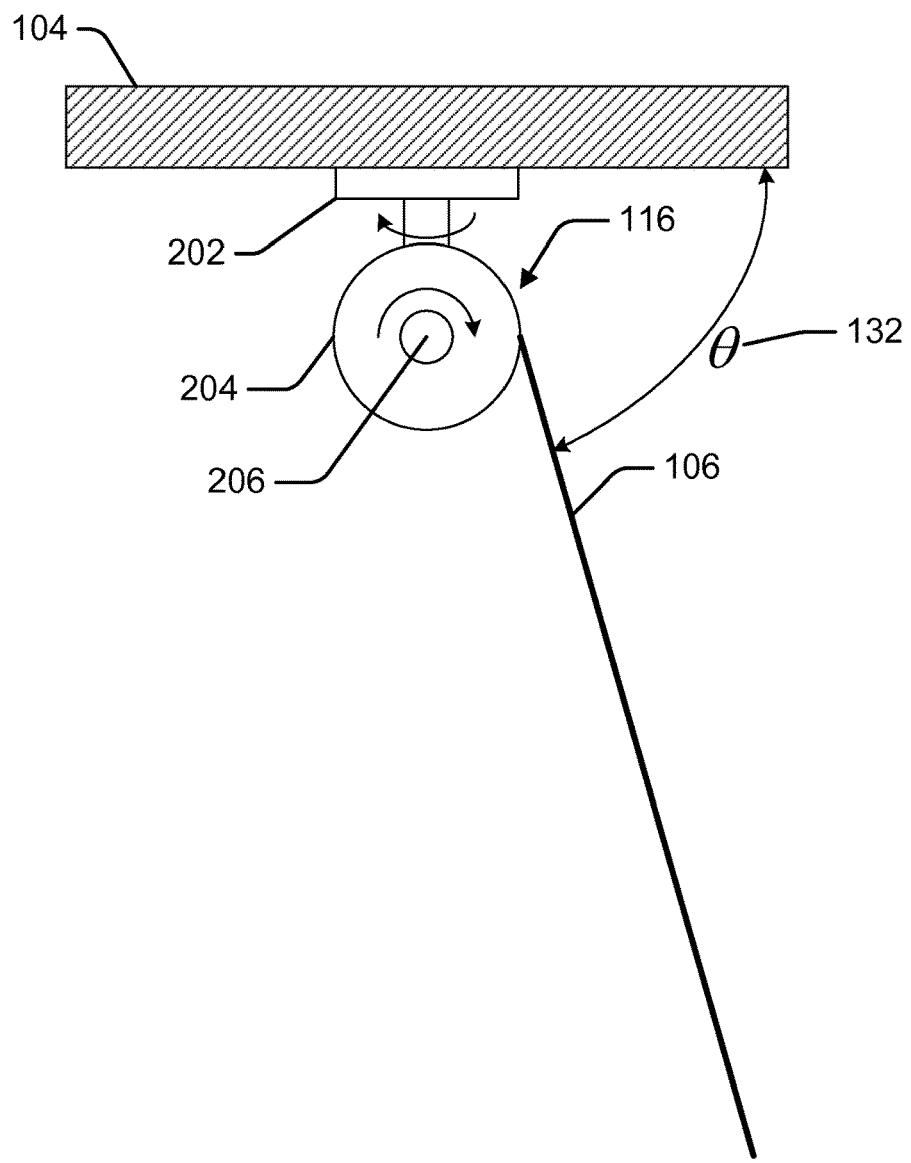
FIG. 2 is a side elevation view of a tethering system for attaching a UAV to a shuttle.
Figures 3A, 3B:
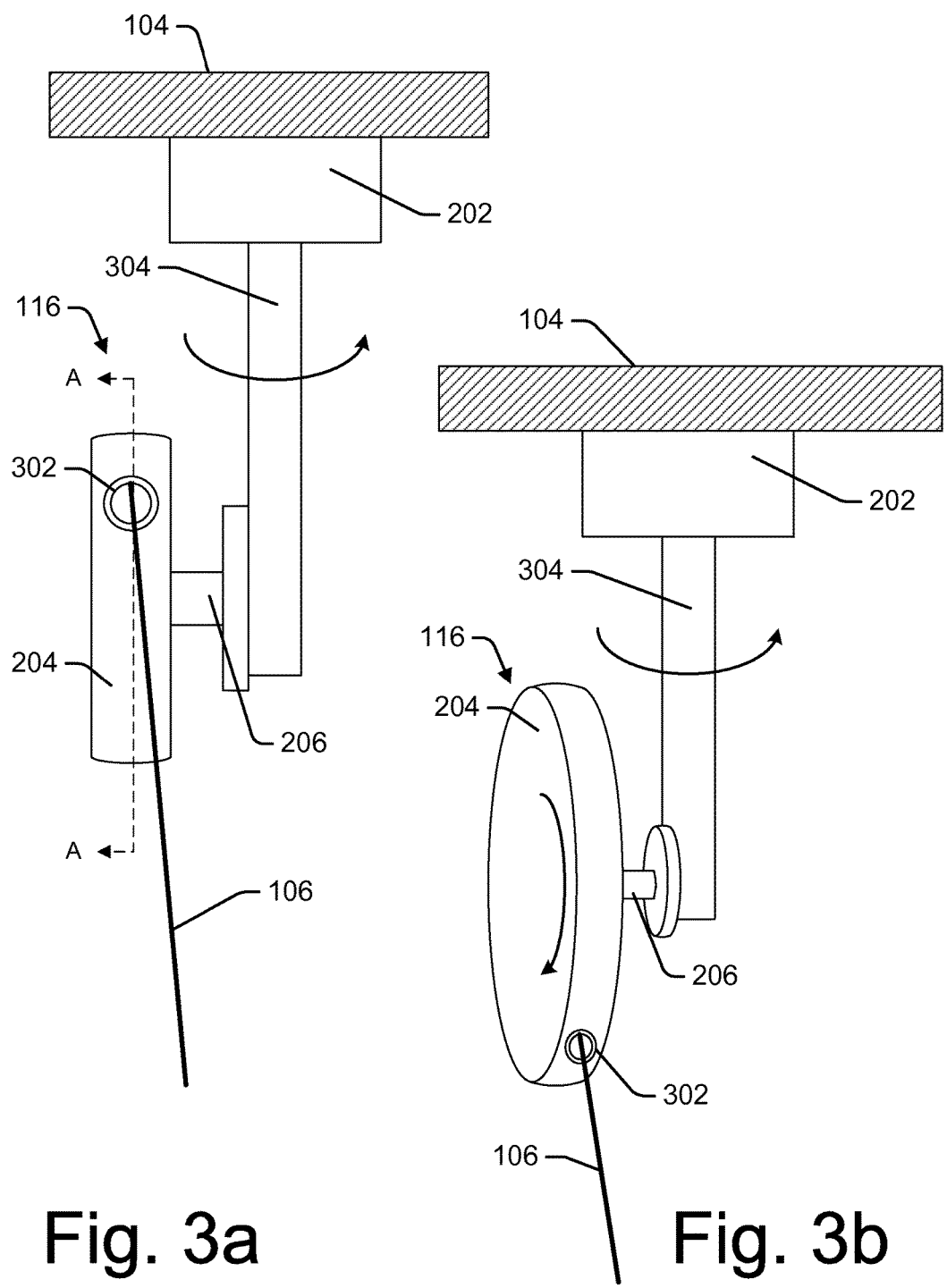
FIG. 3a is a front elevation view illustrating an example of a tethering system having a reel with sensors.
FIG. 3b is a perspective view of a tethering system having a reel with sensors.

With reference to FIGS. 2, 3a, and 3b, in some embodiments, the shuttle controller 120 receives angle sensor data 122 from an angle sensor 202. The angle sensor 202 may be able to detect the angle θ 132 at which the tethering line 106 is extending away from the shuttle 104. For example, the reel 116 may have an outer housing 204 that is able to rotate about a central axis 206. For purposes of illustration, the shuttle 104 is shown with the reel 116 suspended directly beneath the shuttle 104. In this orientation, the outer housing 204 of the reel 116 rotates about a horizontal axis 206. The outer housing 204 has an aperture 302 formed therein for allowing the tethering line 116 to pass therethrough. In some embodiments, the outer housing 204 rotates in response to the direction of the tethering line 106. In other words, when the UAV 102 is directly below the shuttle, the outer housing 204 may rotate so that the aperture 302 is positioned generally downward. Likewise, the outer housing 204 may rotate as the UAV 102 flies around and the force imparted on the outer housing 204 from the tethering line 106 contacting the periphery of the aperture 302 causes the outer housing 204 to rotate. In one embodiment, the rotation of the outer housing 204 is detected by the rotation sensor 202. The rotation sensor 202 thus can determine and generate data corresponding with the rotation of the outer housing 204 that can be used to determine the altitude of the UAV 102 relative to the shuttle 104.

Continuing with the example, the reel 116 may also rotate about a vertical axis 304. The rotation sensor 202 may generate data corresponding with the rotation of the reel 116 about the vertical axis 304. This data can be used to determine the lateral direction that the UAV 102 is in relation to the shuttle 104.

Thus, the rotation sensor 202 can determine both the lateral direction component and the vertical direction component of the UAV 102 in relation to the shuttle 104. The extended tethering line 106 may be represented mathematically by a vector having a direction and a magnitude, where the direction represents the direction of the UAV 102 in relation to the shuttle 104 and the magnitude represents the length of the tethering line 106 that has been extended. Accordingly, the rotation sensor 202 can determine the direction component of the vector that describes the position of the UAV 102 relative to the shuttle 104. The rotation sensor 202 may generate angle sensor data 122 corresponding to the direction component of the vector and send this information to the shuttle controller 120.

The shuttle controller 120 may use the angle sensor data 122 to compute the relative direction of the UAV 102 with respect to the shuttle 104, or may send this data to the central controller 118 for processing. It may also be desirable for the shuttle controller 120 to ascertain the length of the tethering line 106 that has been extended from the reel 116.

While the reel 116 has been described as being mounted to a shuttle 106, the reel 116 may be statically mounted, such as to a ceiling, a tower, or other such rigid structure. For example, in FIGS. 2, 3a, 3b, and 6, in place of the shuttle 104, the reel 116 could be mounted to a ceiling of a building. In this way, the reel 116 will be able to detect the position of the UAV 102 from a fixed position. In some instances, this may provide a more robust platform for delivering electricity or data signals through the tethering line 106 and may be used, for example, during launch of a UAV 102 such that the UAV 102 can receive electricity and/or positioning information through the tethering line 106, and then disengage from the tethering line 106.

Figure 4:
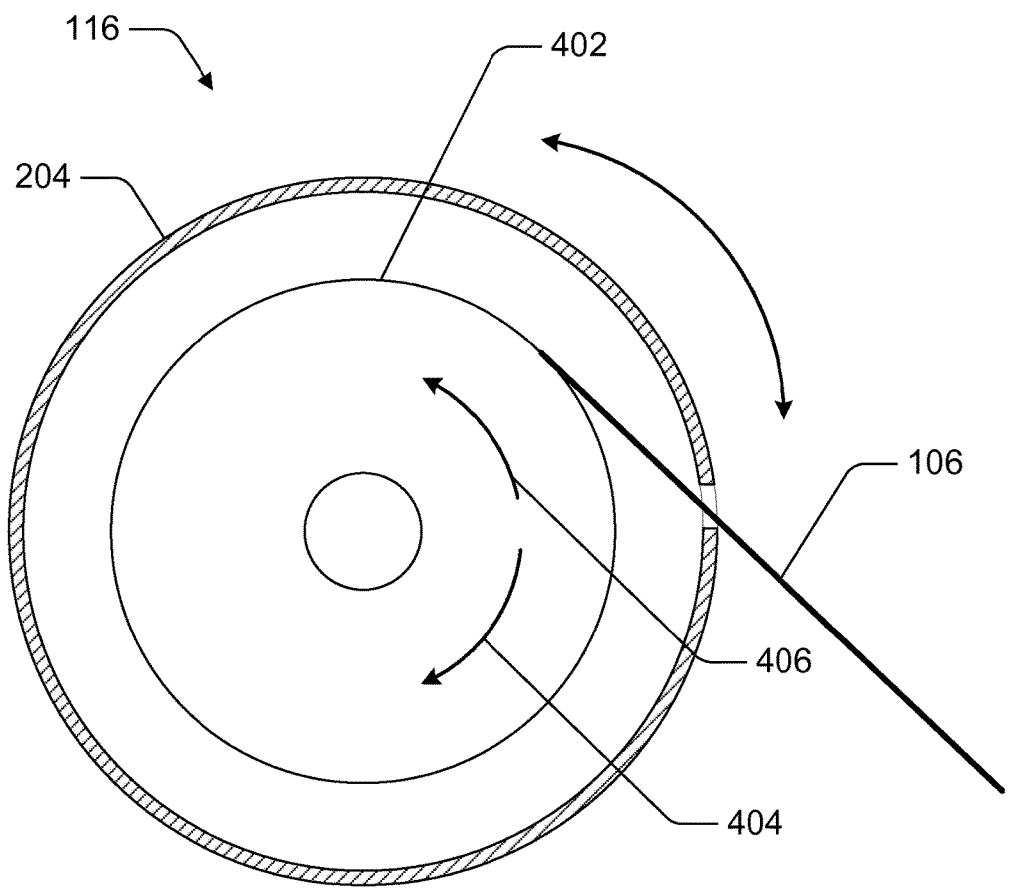
FIG. 4 is a cross-sectional view taken along the line A-A of FIG. 3a and illustrates another example of a reel having a rotatable outer housing and an internal spool that can rotate independently of the housing.

With reference to FIG. 4, the reel 116 may have a spool 402 within the outer housing 204 about which the tethering line 106 is wound. The spool 402 may be able to rotate in an extending direction 404 and a retracting direction 406 to extend or retract the tethering line 106. As described above, the spool 402 may be biased, such as by a spring, in the retracting direction 406 so that the spring maintains tension on the tethering line 106 and the bias to retract is overcome as the UAV 102 flies away from the shuttle 104, thus pulling the tethering line 106 and rotating the spool 402 in the extending direction 404.

The bias to retract and the tethering line 106 may be selected and configured such that the force required to overcome the bias to retract and rotate the spool 402 in the extending direction 404 is relatively weak such that the flight of the UAV 102 is not detrimentally affected by the bias to retract the tethering line 106. There may be a sensor configured to determine the degrees of rotation of the spool 402, and thereby detect the length of the tethering line 106 that has been extended. The sensors may be electronic, such as a potentiometer, may be optical, or may employ any other suitable sensor technology that can be used to determine the length of the tethering line 106 that has been extended.

According to other embodiments, the spool 402 is motorized, or otherwise under powered control. In one instance, the spool 402 is rotatable in the extending direction 404 and the retracting direction 406 by a motor (not shown). The motor may be under the control of the shuttle controller 120, and more specifically, the motor controller 128. The shuttle controller 120 may receive the angle sensor data 122 from the rotation sensor 202 along with the tether length sensor data 124, and over a period of time, predict the flight path and velocity of the UAV 102 and automatically begin to extend or retract the tethering line 106 in anticipation of the predicted flight path of the UAV 102 to maintain a desired tension on the tethering line 106.

Alternatively, rather than rely on predicted behavior of the UAV 102, the shuttle controller 120 may receive flight control commands from the central processor 118 and use this information to extend or retract the tethering line 106 during the flight of the UAV 102 to maintain a desired tension on the tethering line 106. In still other embodiments, the tension on the tethering line 106 is detected, such as by a sensor on the reel, and the spool 402 may be rotated in the appropriate direction to maintain a desired tension on the tethering line 106.

The shuttle controller 120 may additionally limit the maximum length of tethering line 106 that can be extended based upon environmental obstacles. For example, if the terrain is uneven, the shuttle controller 120 may vary the maximum length of tethering line 106 that is available to be extended based upon the position of the UAV 102 relative to the terrain. Information describing the terrain may be provided to the shuttle controller 120 such as by a computer aided design ("CAD") model or through some other manner that describes any obstacles within the flying environment, including the ground, walls, ceiling, or any other obstacle that could interfere with the flight of the UAV 102. Additionally, ranging sensors, such as radar or laser ranging sensors, may be implemented within the UAV 102, the shuttle 104, the track 108, or a combination to detect the variation, or any changes, in the terrain and provide terrain data to the shuttle controller 120 which can then vary the maximum length of tethering line 106 that is able to be extended to prevent the UAV 102 from being able to contact an obstacle. The ranging sensors may also detect obstacles, (e.g., the walls, floor, or ceiling of a building) in which the UAV 102 may be operating, and may send ranging data to the shuttle controller 120 which can inhibit the reel 116 from extending the tethering line 106 an amount that would allow the UAV 102 to contact an obstacle within the flying environment. In this way, even if the UAV 102 loses navigation control or has a catastrophic failure, the UAV 102 will be restrained by the tethering line 106 and therefore inhibited from crashing into an obstacle (including the ground) within the flying environment.

Figure 5:
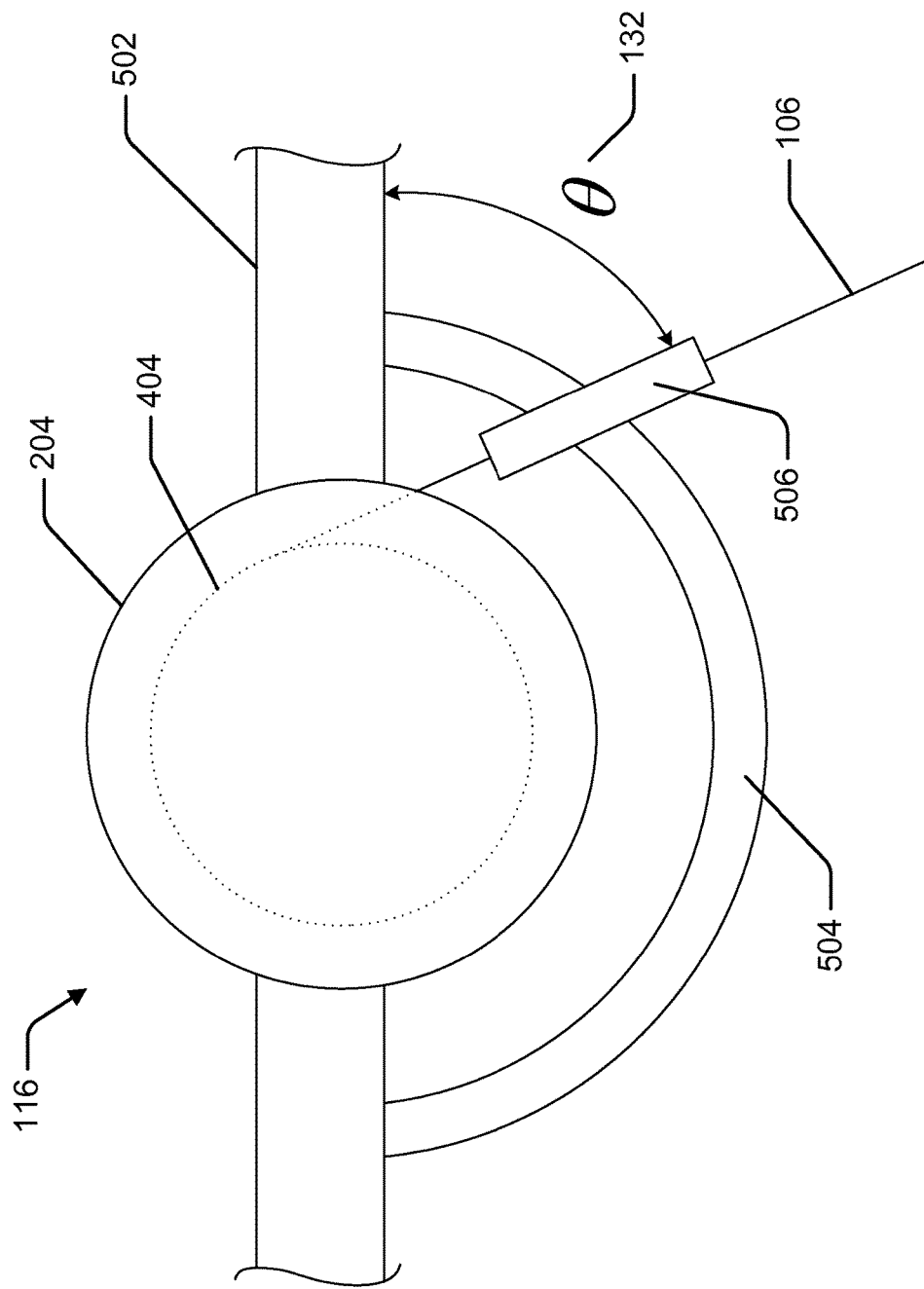
FIG. 5 is a side elevation view of one embodiment of an angle sensor on a reel of a tethering system.

Turning now to FIG. 5, one example of an angle sensor 500 is illustrated. The reel 116 may be attached to a rigid frame 502 or even to the shuttle 104. A scale 504, such as a magnetic ring, may be used to detect the position of a sensing element 506, which may likewise be magnetic. In one embodiment, the tethering line 106 passes along, or through, the sensing element 506 and as the UAV 102 changes its location, the tethering line 106 will impinge on the sensing element 506 causing it to move along the scale 504. The scale 504 may be able to determine the location of the sensing element 506 along the scale 504 and generate data that corresponds with the position of the sensing element 506 along the scale 504. Additionally, an accelerometer could likewise be used to measure the displacement of the sensing element 506 along the scale. For example, an accelerometer could be attached to the sensing element 506 and may be used to accurately measure the angle in 3D space of the sensing element 506.

The data corresponding with the position of the sensing element 506 along the scale 504 may be used to calculate the angle θ 132 at which the tethering line 106 extends away from the shuttle 104. While FIG. 5 illustrates measuring an angle in two axes, this may be implemented with other rotation elements or other sensors that can be combined to provide a true three axis angle to determine the direction of the UAV 102 in relation to the shuttle 104.

Figure 6:
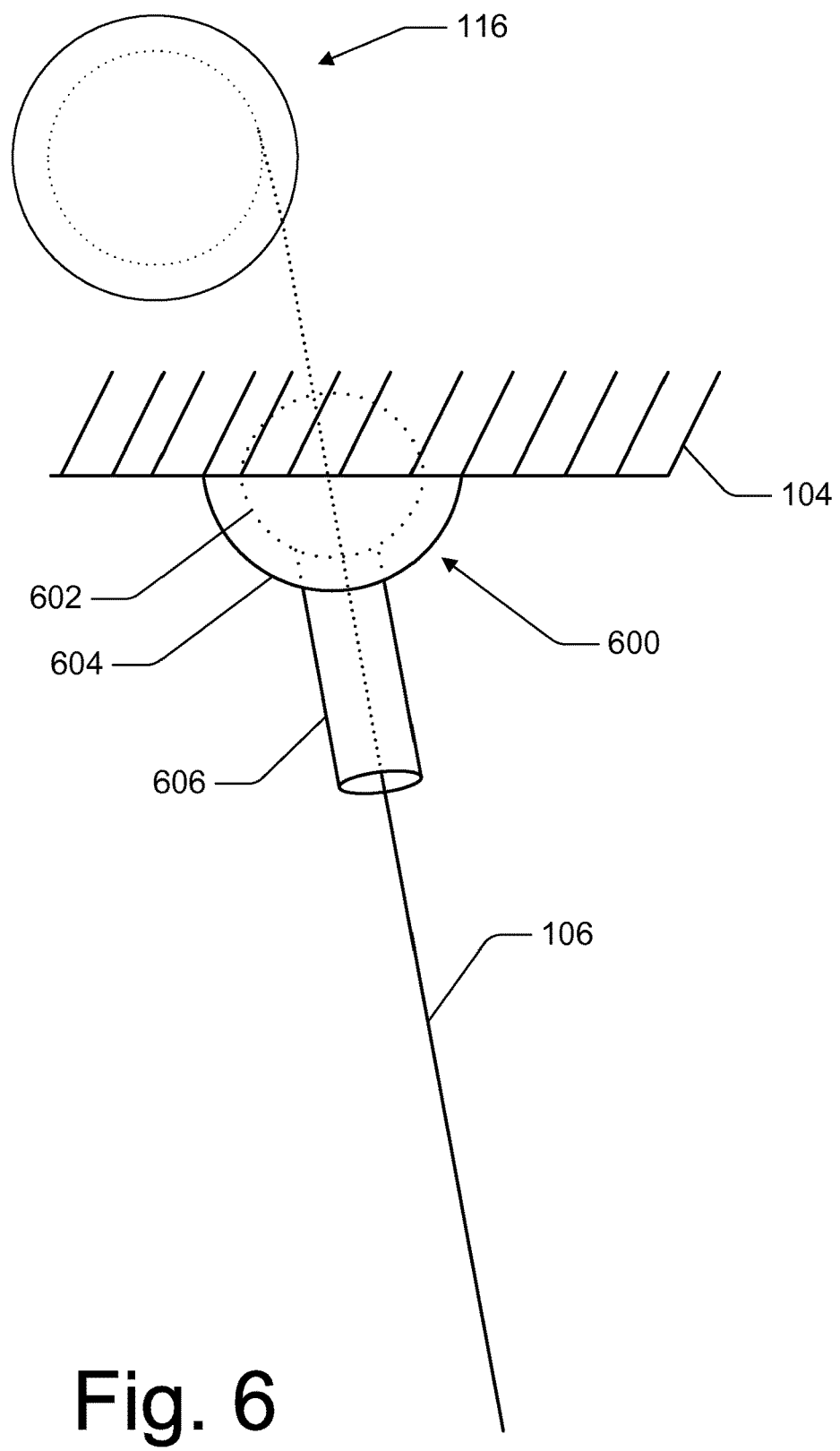
FIG. 6 is a side elevation view illustrating another embodiment of an angle sensor for use with a reel of a tethering system.

According to FIG. 6, another angle sensor 600 is illustrated. The angle sensor 600 generally comprises a ball 602 and socket 604 configuration. As shown, a ball 602 resides within a socket 604 and is able to rotate within the socket 604. The tethering line 106 may pass through the ball 602, the socket 604, and a directional tube 606 extending from the ball 602. The angle sensor 600 may include sensors to detect the angle of the directional tube 606 with respect to the shuttle 104. As the UAV 102 flies around and changes its position relative to the shuttle 104, the tethering line 106 will contact and move the directional tube 606 thereby changing the orientation of the ball 602 within the socket 604. The angle sensor 600 may utilize magnets, circuit traces, electrically conductive contact points, or some other method for ascertaining the orientation of the ball 602 within the socket 604 and thereby determine the direction of the directional tube 606 and therefore the direction of the tethering line 106.

In operation, as the UAV 102 flies about the available airspace, the tethering line 106 will contact the inner periphery of the directional tube 606 and apply a force sufficient to move the tube and the attached ball 602 within the socket 604. The movement, or the orientation of, the directional tube 606 may be detected and used to generate data indicating the direction of the UAV 102. This information combined with the tether length sensor data 124 can be used to determine the three-dimensional position of the UAV 102 in relation to the shuttle 104.

One consideration while operating a tethered aerial vehicle, such as a UAV 102, is a desire to avoid contact between the tethering line 106 and the rotors or propellers of the UAV 102. One solution to this issue is shown in FIG. 1, where a multi-point harness is attached to the UAV 102. The harness may be rigid or semi-rigid and provide a location spaced away from the UAV 102 for attaching the tethering line 106.

Another example, as illustrated in FIG. 7a, shows a gimbal 702 surrounding the UAV 102. In this example, a gimbal 702 includes an inner ring 704 and an outer ring 706. The inner ring 704 is pivotally connected to the UAV 102, such as by journaled connections 708a, 708b at two diametrically opposing locations. The journaled connections 708a, 708b along the diameter of the inner ring 704, allow the inner ring 704 to freely rotate about the UAV 102. The outer ring 706 is pivotally connected to the inner ring 704, such as by journaled connections 710a, 710b at two diametrically opposed locations. In some embodiments, the diametrically opposed locations of the inner ring 708a, 708b, and the outer ring 710a, 710b are orthogonal to one another. In other words, the diameter of the inner ring 704 formed by a line drawn through the journaled connections 708a, 708b is ninety degrees to the diameter of the outer ring 706 formed by a line drawn through the journaled connections 710a, 710b. The inner ring 704 and outer ring 706 thus form a gimbaled cage around the UAV 102.

An attachment point 712 may be formed on the outer ring 706 where the tethering line 106 can connect to the gimbal 702. In some instances, the attachment point 712 is spaced ninety degrees away from the journaled connections 710a, 710b. Through this configuration, the tethering line 106 is kept away from the rotors of the UAV 102. Additionally, the gimbal 702 allows the attachment point 712 to point toward the reel 116 while the UAV 102 is in flight. This may have a tendency to reduce unwanted effects of the tethering line 106 on the flight characteristics of the UAV. For example, if the attachment point 712 of the tether to the UAV 102 were static and located at the top of the UAV 102, or above the UAV, then as the UAV 102 flies away from the shuttle 104 and causes the tethering line 106 to tension, the resulting force would tend to tip the UAV 102 away from an upright orientation. In the illustrated configuration, by allowing the attachment point 712 to freely move about the UAV, such as by the illustrated gimbal 702, any tension acting on the UAV 102 from the tethering line 106 will not cause the UAV 102 to tip, but rather, will allow it to maintain an upright orientation as it flies. In other words, through this embodiment, the attachment point 712 of the tethering line 106 to the gimbal 702 will be able to reorient itself so that there is a straight line from the reel through the attachment point and to the UAV 102.

Figure 7:
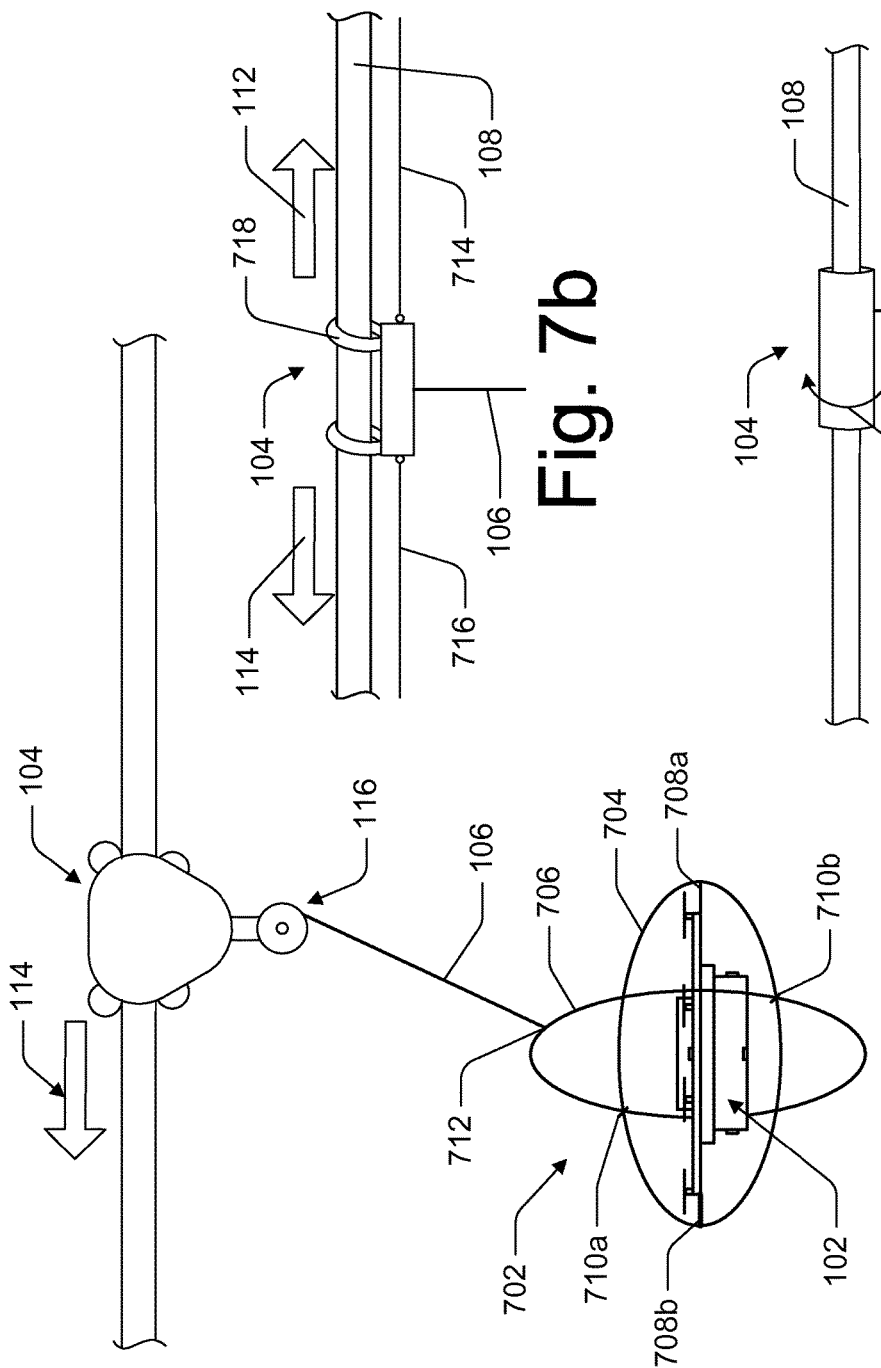
FIG. 7a is a side elevation view illustrating one example of a shuttle engaged with a track and tethered to a UAV.
FIG. 7b is a side elevation view showing another example of a shuttle engaged with a track where the shuttle can be pulled along the track by an external cable system.
FIG. 7c is a side elevation view illustrating another example of a shuttle engaged with a track where the shuttle can rotate about its longitudinal axis about the track.

As also illustrated in FIG. 7, as the UAV 102 flies in a backward direction 114 relative to the shuttle 104 and causes the tethering line 106 to form an angle that is less than ninety degrees with respect to the track 108, the shuttle 104 may move in a backward direction 114 to keep up with the UAV 102. Where the UAV 102 is flying directly below the shuttle 104 and then moves in a backward direction 114, the shuttle 106 may also move in a backward direction 114 to stay directly above the UAV 102. As described above, the shuttle 104 may move by engaging its internal motors, it may be pulled by the UAV 102, or may be moved by an external force.

As shown in FIG. 7b, the shuttle 104 may be connected to a forward pull cable 714 and a backward pull cable 716 (collectively, "pull cables"). The pull cables 714, 716 may be connected to a motor, a pulley, a conveyor, or some other device that can apply tension to the pull cables 714, 716 to move the shuttle 106 along the track 108 in a forward direction 112 or a backward direction 114. The pull cables 714, 716 may be used to move the shuttle 106 along the track 108 in response to the relative position of the UAV 102 that may be determined by the shuttle controller 120 or the central controller 118. Moreover, the pull cables 714, 716 may be preprogrammed to move a certain distance, at a certain velocity, at a certain time based upon navigation commands that are predetermined and communicated to the UAV 102. The pull cables 714, 716 may also be manually operated to reposition the shuttle 104 as the UAV 102 maneuvers about the flying environment.

As further illustrated in FIG. 7b, the shuttle 104 may be suspended from the track 108 by one or more supports 718. The supports 718 may be made of, or coated with, a lubricious material that is configured to slide along the track 108. The supports 718 may also house bearings and may function as a bearing raceway configured to maintain bearings in rolling engagement with the track thus allowing the shuttle 718 to move along the track 108 with relatively little friction. In this embodiment, or other embodiments, the reel (not shown) may be disposed within the shuttle 104 and the tethering line 106 may extend through an opening in the shuttle 104.

Referring to FIG. 7c, the shuttle 104 may be designed to substantially encompass the track 108. In one embodiment, the shuttle 104 may be generally cylindrical in shape and the track 108 may be a pipe, tube, rod, cable or some other configuration that has a generally circular cross section. In this and similar embodiments, the shuttle 104 may be configured to rotate about the track 104 such as indicated by arrow 720. This may be useful in those instances in which the UAV 102 is programmed to fly both above and below the shuttle 104. In these cases, as the UAV 102 transitions from flying below the shuttle 104 to flying above the shuttle 104, the shuttle 104 can rotate about the track 108 to maintain a straight line of the tethering line 106 between the reel 116 and the UAV 102.

Moreover, this configuration allows the UAV 102 the fly around the shuttle 104 without the risk that the tethering line 106 may become wrapped around the shuttle 104 or the track 108.

The shuttle 104 may be spaced away from the track by wheels, bearings, rollers, or may not be in contact with the track at all. For example, the shuttle 104 may be configured to magnetically levitate away from the track so that there is no physical contact between the shuttle 104 and the track 108. The result is a very smooth movement along the track with no rolling resistance and minimal air resistance. In these embodiments, the shuttle 104 may be propelled along the track 108 through varying the magnetic field around the track 108.

The shuttle 104 may rotate about the track 108 in response to the navigation commands sent to the UAV 102, or in response the angle sensors 202 detecting the tethering line 106 is moving beyond a predetermined angle formed by the tethering line 106 and the shuttle 104. The shuttle 104 may effect a rotation about the track by activating one or more motors that cause the shuttle 104 to rotate its orientation. As also shown in FIG. 7c, the reel (not shown) may be internal to the shuttle 104 and the tethering line 106 may extend through an opening in the shuttle 104.

Figure 8:
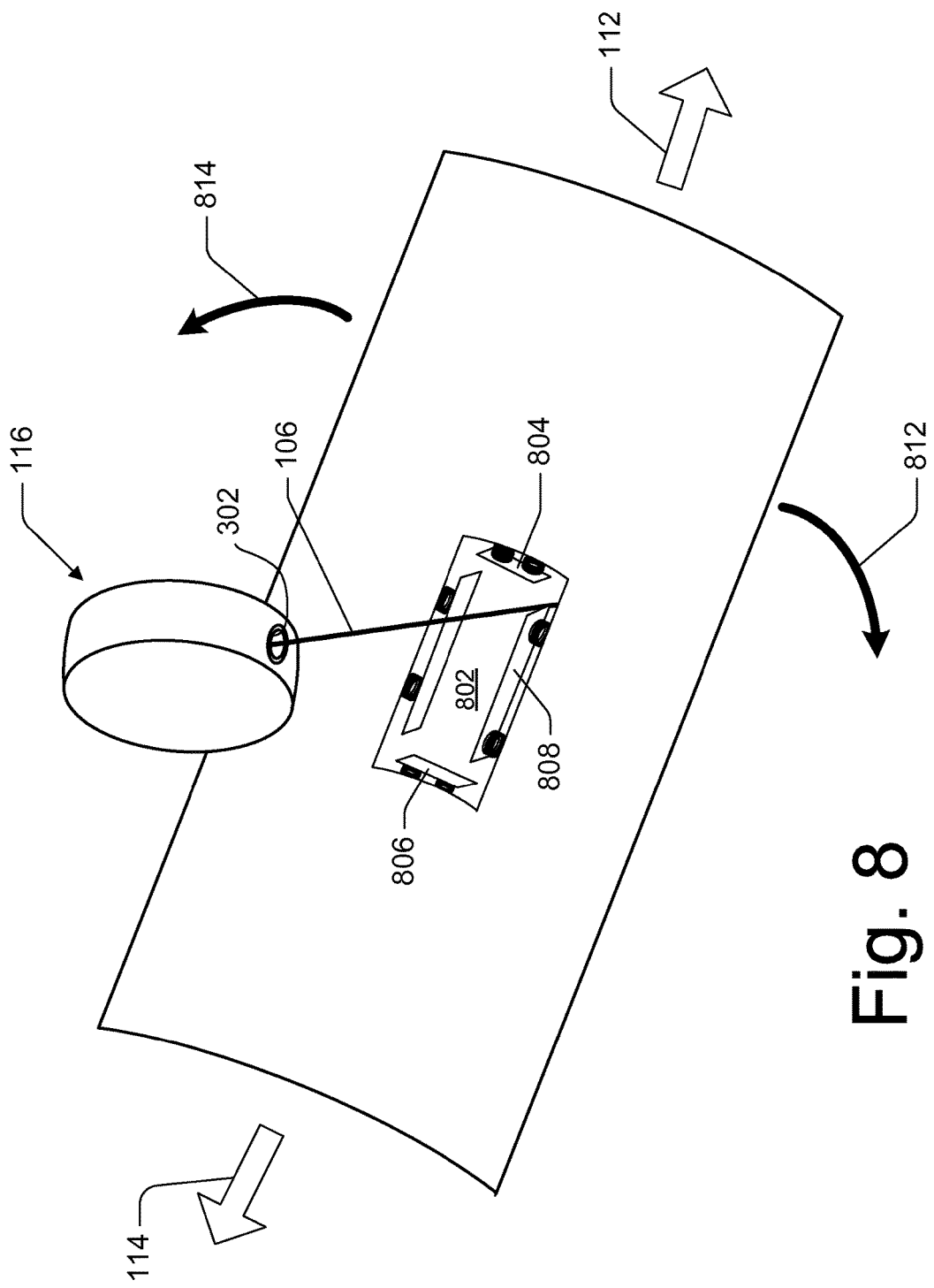
FIG. 8 is a perspective view showing one example of sensors located on the shuttle for repositioning the shuttle in response to the position of the UAV.

As illustrated in FIG. 8, the shuttle 104 may have an opening 802 through which the tethering line 106 may pass. One or more sensors, such as pressure sensors, may be placed and configured to detect contact between the tethering line 106 and the sensors. For example, a forward pressure sensor 804 may detect contact with the tethering line 106 as the UAV 102 moves in a forward 112 direction a predetermined distance such that the tethering line 106 comes into contact with the forward pressure sensor 804.

The shuttle 104 may be programmed to move in a forward direction 112 as the forward pressure sensor 804 detects contact with the tethering line 106. Similarly, a rear pressure sensor 806 may be able to detect contact with the tethering line 106 as the UAV 102 flies in a backward direction 114 beyond a predetermined distance from the shuttle 104, in which case, the shuttle 104 may be programmed to move in a backward direction 114 to maintain its relative orientation with the UAV 102.

Similarly, in those embodiments in which the shuttle 104 is able to rotate about the track 108, the shuttle 104 may have lateral sensors 808, 810 that, when sensing contact with the tethering line 106, may signal the shuttle 104 to rotate in a clockwise direction 812 or a counter-clockwise direction 814 about the track 108. Of course, the illustration is an example of various sensors that may be used to detect the relative position of the UAV 102 and provide a control input to the shuttle 104 to reposition the shuttle 104 relative to the UAV 102. There may be more or fewer sensors disposed at various locations about the shuttle 104. For example, the shuttle 104 may only contain a forward pressure sensor 804 and/or a rear pressure sensor 806 to signal the shuttle 104 to move in a forward direction 112 or a backward direction 114. Moreover, the sensor need not be pressure sensors, but could be any suitable configuration or technology that senses the direction of the UAV 102 and signals the shuttle 104 to follow.

While the reel 116 is shown as a simple reel 116 with a single aperture, it should be appreciated that the reel 116 can have any suitable configuration that is capable of extending or retracting a tethering line 106. It may be motorized or spring-loaded as described herein, or may have other configurations to allow it to securely inhibit the UAV 102 from undesirably impacting an object.

The reel 116 may be configured to vary the maximum length of the tethering line 106 that is available to be extended based upon environmental factors. For example, where the central controller 118 or the shuttle controller 120 are aware of obstacles, such as through terrain sensors, preprogrammed terrain information, or otherwise, the reel 116 may be configured to limit the maximum length of the tethering line 106 to a predetermined distance so as to prevent the shuttle 102 from contacting any objects. The distance may vary based upon the position of the shuttle 104 along the track 108. For example, where the UAV 102 is flying in an environment with obstacles, such as perhaps in a warehouse where there may be furniture, stacks of merchandise, walls, stairs, railings, or other such obstacles, the reel 116 may be configured to vary the maximum length of the tethering line 106 when the shuttle 104 is nearer to a wall, or when it moves above a stack of merchandise. In some instances, the reel 116 may be configured to establish a maximum length of tethering line 106 that is able to be extended such that the UAV 102 will not be able to contact the obstacles within the environment.

Figure 9:
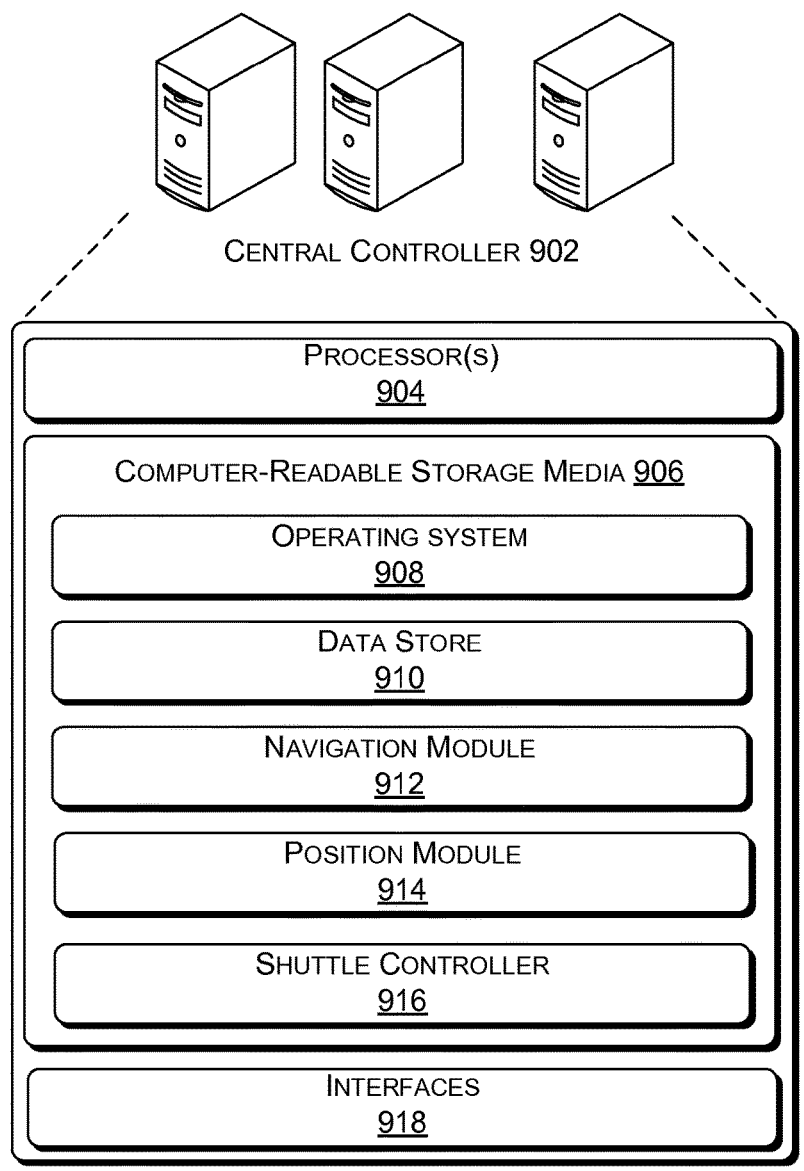
FIG. 9 is a block diagram of an illustrative central controller and the operation thereof.

FIG. 9 provides some example details regarding a central controller 902 that may be implemented in conjunction with the additional devices described herein. In particular, the central controller 902 may include one or more processors 904 and one or more modules stored in memory. The central controller 902 may have access to computer-readable storage media ("CRSM") 906, which may be any available physical media accessible by the processor(s) 904 to execute instruction stored on the CRSM 906. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 904.

The CRSM may additionally include an operating system 908, a data store 910, a navigation module 912, a position module 914, and a shuttle controller 916. In addition to the processor(s) 904, and the CRSM 906, the central controller 902 may additionally contain interfaces 918, such as for communication with the shuttle 104 and/or the UAV 102.

The data store 910 may contain data specific to the shuttle 104 and the UAV 102. For example, the data store 910 may contain details regarding the identification, characteristics, hardware configuration, speed data, and other such data that may be relevant to the operation and testing of the UAV 102 and the shuttle 104. Moreover, the data store 910 may also archive information about the shuttle 104 and/or the UAV 102. Specifically, the data store 910 may store flight data from the UAV 102, such as flight characteristics, speed data, duration, power consumption, load carrying capacity, stability, altitude, maneuverability, responsiveness, latency, among other characteristics that may be stored for later review and analysis.

The central controller 902 may be provided with a navigation module 912 that is configured to store and transmit navigational commands to the UAV 102 and/or the shuttle 104. The data store 910 may also contain a series of programmed navigation instructions that it may send to the UAV 102 in order to instruct the UAV 102 to make maneuvers or fly a specified course. These instructions may include powering on, increasing the motor speed, banking, forward flight, and landing instructions, among others. The navigation module 912 may also receive data from the UAV 102, such as, for example, confirmation of received navigation instructions, compliance with the navigation instructions, latency of the time between when navigation instructions are received and when they are carried out, among others.

The navigation module 912 may also send maneuvering instructions to the UAV 102 in real-time or near real-time, for example, when the UAV 102 is being piloted by a user inputting control commands during a flight of the UAV 102. The control commands may be input by a computer interface, such as a keyboard, mouse, touchpad, joystick, or other computer interface device that allows a user to input commands. The control commands may also be input via a radio-control transmitter, such as a transmitter configured to operate within the frequencies designated by the Federal Communications Commission for model aircraft, such as 72 MHz, or 2.4 GHz utilizing spread spectrum communication technologies.

The shuttle controller 916 may optionally be stored in the CRSM 906 of the central controller 902. As described above, the shuttle controller may be stored in the shuttle, in the central controller 902, or a combination of both. In some embodiments, a shuttle controller 916 is stored within the central controller 902 and is configured to issue commands to the shuttle 104 such as for moving along the track 108 to maintain its relative position to the UAV 102. The shuttle controller 916 may also detect the position of the shuttle 104 along the track 108, such as by receiving information that indicates the rolling movement of wheels associated with the shuttle, or by sensors located within or along the track 108. Other methods of detecting the shuttle 104 position include optical sensors, marks or other indicia placed along the track 108, magnetic sensors, or any other suitable method for determining the position of the shuttle 104 along the track 108.

The central controller 902 may have one or more interfaces 918, such as for communication, which may include one or more wireless interfaces for communication with the UAV 102 and/or the shuttle 104. The interfaces 918 may implement one or more of various wireless technologies, such as Wi-Fi, Bluetooth, radio frequency (RF) and so on. The interfaces 918 may also include various interfaces for connecting external components, such as universal serial bus ("USB") devices, networking devices, storage devices, and so on.

The central controller 902 may connect to a network, such as the internet, via wired technologies (e.g., wires, USB, fiber optic cable, etc.), wireless technologies (e.g., RF, cellular, satellite, Bluetooth, etc.), or other suitable connection technologies.

Figure 10:
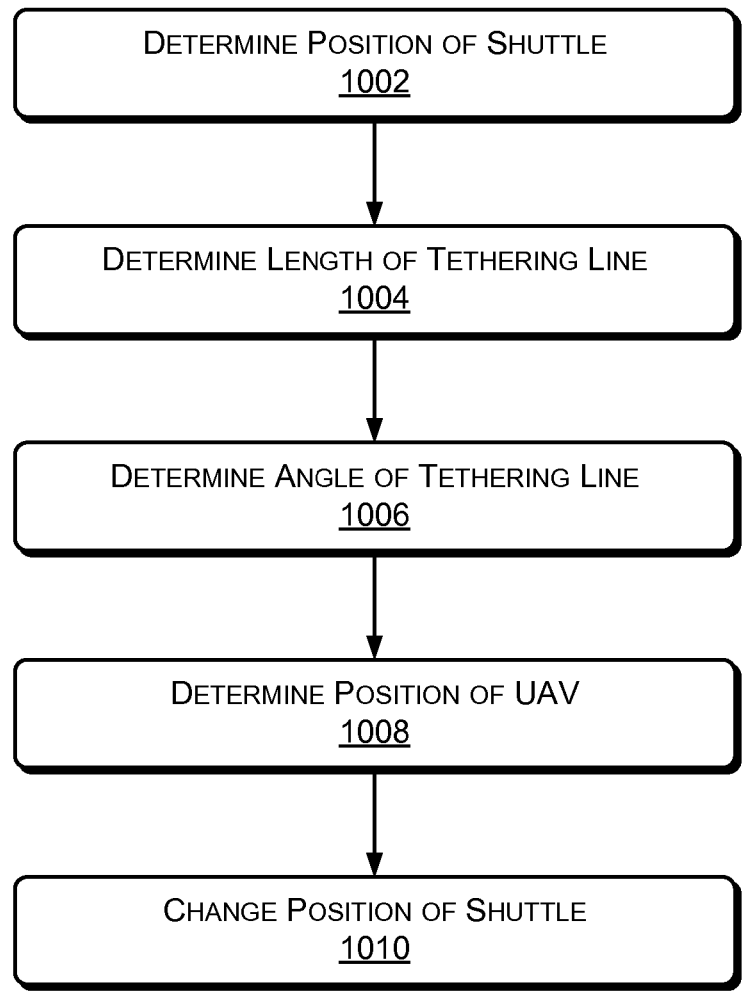
FIG. 10 is a flow diagram of an illustrative process for determining the position of a UAV and reducing the effects of the tether on the UAV.

FIG. 10 is a flow diagram 1000 illustrating an example process for determining the position of the UAV 102 and for reducing the effects of the tethering line 106 on the flight of the UAV 102. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the processes. Moreover, some of the operations can be omitted or repeated during the process.

At block 1002, the position of the shuttle 104 along the track 108 is determined. This determination may be made through any suitable method, such as by GPS data, sensors that can detect the position of the shuttle 104 relative to the track 108, sensors that detect the rolling of wheels on the shuttle 104 and the distance the rolling wheels have moved the shuttle 104, optical sensors, magnetic sensors, or some other method.

At block 1004, the length of the extended tethering line 106 is determined. As discussed herein, this may be accomplished through any suitable method and any suitable combination of hardware and/or software. For example, the length of the extended tethering line 106 may be determined by a sensor on a reel 404 or a spool 116 that unwinds in order to extend the tethering line 106. By knowing the diameter of the spool 116 and the tethering line 106 that is wound about it, a fairly accurate estimate can be calculated for the length of the tethering line 106 that has been unwound from the spool 116 by detecting the rotation of the spool 116. There may also be optical sensors that detect markings on the tether, among other possibilities.

At block 1006, the angle at which the tethering line 106 extends away from the shuttle 104 is determined. This may be done through any of a variety of methods and devices. Some of which include rotation sensors that detect the orientation of the reel 116 as the tension on the tethering line 106 causes the reel 116 to reorient itself in relation to the UAV 102 attached to the tethering line 106. Other sensors, such as optical sensors may be used to determine the angle of the tethering line 106 in relation to the shuttle 104.

At block 1008, the position of the UAV 102 may be determined. Once the angle of the tethering line 106 relative to the shuttle 104 and the length of extended tethering line 106 are known, this information can be used to determine the position of the UAV 102 relative to the shuttle 104. Moreover, once the position of the shuttle 104 is known along the track 108, this information can be used to convert the relative position of the UAV 102 into an absolute position. As described herein, the absolute position of the UAV 102 may be expressed in terms of GPS coordinates, or may be expressed relative to the environment in which the UAV 102 is operating, such as the coordinate space within a building.

At block 1010, the position of the shuttle 104 can be changed in response to the location of the UAV 102. For example, where the UAV 102 is flying in front of or behind the shuttle 104, the tension on the tethering line 106 will have a tendency to pull the shuttle along the track 108, which may increase the tension in the tethering line 106 and impart drag onto the UAV 102. In order to reduce the effects the shuttle 104 may impart on the flight of the UAV 102, the tension in the tethering line 106 may be monitored and maintained fairly constant. One way of doing so is for the shuttle 104 to move in relation to the UAV 102. The shuttle 104 may have sensors of its own that detect the relative position of the UAV and engage motors within the shuttle 104 to move the shuttle 104 along the track 108. Alternatively, the shuttle 104 may receive instructions from the central processor 118 to relocate to match pace with the UAV 102. In other instances, one or more external motors may be able to pull the shuttle 104 along the track 108, such as by having pull cables attached to the shuttle 104. Finally, the shuttle 104 may move along the track 108 through some other force, such as a magnetic force. In any implementation, moving the shuttle 104 along the track 108 may be able to minimize any effects that the tethering line 106 may have on the UAV 102. The reel 116 may then be free to maintain a desired tension on the tethering line 106, absent overwhelming tension forces in the tethering line 106 caused by the shuttle 104 imparting drag on the UAV 102.

The tethering line 116 may selectively be disengaged from the UAV 102. For example, the tethering line 116 may be used to provide electrical power, navigation commands, and/or position data while the tethering line 116 is engaged with the UAV; however, in some instances, the tethering line 116 may be selectively disengaged from the UAV 102 and the UAV 102 may then fly under its own power. In other embodiments, the UAV 102 may utilize its own positioning data and guidance systems and receive only electrical power through the tethering line 106. In other instances, the UAV 102 may rely on data from the central processor 118, such as navigation information and positioning data, that may be transmitted to the UAV 102 wirelessly.

In this way, the UAV 102 may be able to utilize external electrical power to initialize the systems of the UAV 102, climb to altitude, and receive accurate positioning data before commencing flight under its internal power and navigation data. This allows the UAV 102 to preserve its internal power for longer flights rather than using internal power to initialize the flight and ascend to a proper altitude.

Although embodiments described above and shown in the attached Figures are depicted as having the UAV (e.g., 102) tethered to and suspended from an overhead track (e.g., 108), those having ordinary skill should understand that other configurations may be used without departing from the scope of the invention and claims. For example, in location where tethered operations are desired at higher altitudes (e.g., outdoors), the track (108) may be located at or near the ground with the tether (e.g., 106) extending skyward. In such a configuration, one or more UAVs (102) may remain in air continuously (e.g., using a power transmitting tether, 106) with the operator or control station capable of knowing the position of each UAV (102) without relying on GPS signals from each UAV (102). In contrast, indoor or low altitude tethered operations may favor the overhead design depicted in FIG. 1, depending on design and location constraints (e.g., reduction of trip hazards and interference with other equipment on the floor/ground).

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   an unmanned aerial vehicle ("UAV");
   an elongated track that defines a pathway;
   a shuttle slidably engaged with the track to move along the pathway, wherein the shuttle comprises a shuttle motor that is configured to move the shuttle along the pathway in response to a central processor determining a position of the UAV relative to the shuttle and in response to tension in a tethering line caused by a pulling force associated with movement of the UAV;
   a tether mechanism coupled to the shuttle, the tether mechanism comprising:
      a rotatable spool;
      the tethering line having a first end collected about the rotatable spool and a second end coupled to the UAV, the rotatable spool configured to extend the tethering line as the rotatable spool is rotated in an extending direction and to retract the tethering line as the rotatable spool is rotated in a retracting direction;
      an angle sensor configured to detect an angle of the tethering line in relation to the shuttle and output an angle signal associated with the angle; and
      a distance sensor configured to detect a length of the tethering line extended from the rotatable spool and output a length signal associated with the length; and
   a central processor comprising:
      one or more processors; and
      memory to store computer-executable instructions that, when executed, cause the one or more processors to perform operations comprising:
         generate, based at least partly on the angle signal, angle data;
         generate, based at least partly on the length signal, length data; and
         determine, based at least upon the angle data and the length data, the position of the UAV relative to the shuttle.

2. The system as claimed in claim 1, wherein the tethering line transmits at least one of electrical power or data to the UAV.

3. The system as claimed in claim 1, wherein the shuttle comprises one or more wheels that are configured to roll along the track.

4. The system as claimed in claim 1, further comprising a motor coupled to the rotatable spool and configured to rotate the rotatable spool in the extending direction and the retracting direction.

5. The system as claimed in claim 4, wherein the motor is configured to limit the length of the tethering line extended from the rotatable spool by limiting rotations of the rotatable spool in the extending direction to prevent the UAV from contacting an obstacle.

6. A system comprising:
   an unmanned aerial vehicle ("UAV");
   a track that defines a pathway;
   a shuttle slidably engaged with the track to move along the pathway, wherein the shuttle comprises a shuttle motor that is configured to move the shuttle along the pathway at least in response to a central processor determining a position of the UAV relative to the shuttle and in response to tension in a tethering line caused by a pulling force associated with movement of the UAV;
   a tether mechanism attached to the shuttle, the tether mechanism comprising:
      a rotatable spool;
      the tethering line having a first end collected about the rotatable spool and a second end attached to the UAV, the rotatable spool configured to extend the tethering line as the rotatable spool is rotated in an extending direction and to retract the tethering line as the rotatable spool is rotated in a retracting direction;
      an angle sensor configured to detect an angle of the tethering line in relation to the shuttle;
      a distance sensor configured to detect a length of the tethering line extended from the rotatable spool; and
      a communication interface configured to transmit data associated with the angle and the length;
   one or more processors; and
   memory to store computer-executable instructions that, when executed, cause the one or more processors to perform operations comprising:
      determine, based at least in part on data associated with the angle and the length, the position of the UAV relative to the shuttle.

7. The system as in claim 6, wherein the track has a circular cross section and a longitudinal axis along the length of the track and the shuttle is configured to rotate about the longitudinal axis of the track.

8. The system as in claim 6, wherein the shuttle comprises one or more wheels that are configured to roll along the track.

9. The system as in claim 6, wherein the rotatable spool comprises a motor configured to turn the rotatable spool in the extending direction and the retracting direction.

10. The system as in claim 6, wherein the angle sensor comprises a potentiometer configured to measure the angle of the tethering line in relation to the shuttle by detecting a voltage change across the potentiometer.

11. The system as in claim 6, wherein the tethering line transmits at least one of electricity or data to the UAV.

12. The system as in claim 6, further comprising a shuttle position sensor configured to determine a shuttle position of the shuttle along the track.

13. The system as in claim 12, further comprising a controller configured to provide wireless communication between at least the shuttle and the UAV, the controller configured to:
   receive angle data associated with at least the angle and distance data associated with at least the length;
   receive shuttle position data associated with at least the shuttle position;
   determine, based on the angle data, the distance data, and the shuttle position data, UAV position data; and
   transmit the UAV position data to the UAV.

14. The system as claimed in claim 6, further comprising a gimbaled cage surrounding the UAV, the gimbaled cage including at least an attachment point for the tethering line.

15. The system as claimed in claim 6, wherein the angle sensor comprises a potentiometer configured to vary an applied voltage based upon the angle of the tethering line in relation to the shuttle.

16. A method, comprising:
   determining a first position of a reel coupled to a shuttle slidably engaged with a track that defines a pathway;
   determining, using a length sensor, a length of a tethering line extending from the reel, wherein the tethering line is in tension with a tethered flying vehicle caused by a pulling force associated with movement of the tethered flying vehicle;
   determining, using an angle sensor, an angle relative to horizontal or vertical at which the tethering line extends from the reel;
   determining, based upon the length and the angle, a second position of the tethered flying vehicle relative to the reel; and
   causing the shuttle to move along the pathway in response to determining the second position of the tethered flying vehicle relative to the reel.

17. The method as in claim 16, further comprising: determining, using at least the first position and the second position, an absolute position of the tethered flying vehicle.

18. The method as in claim 17, further comprising transmitting the absolute position of the tethered flying vehicle to the tethered flying vehicle.

19. The method as in claim 16, further comprising limiting the length of the tethering line based upon objects within a vicinity of the tethered flying vehicle.

20. The method as in claim 16, further comprising detaching the tethered flying vehicle from the tethering line during flight of the tethered flying vehicle.

* * * * *